United States Patent
Khadem

(10) Patent No.: US 6,527,891 B2
(45) Date of Patent: *Mar. 4, 2003

(54) MANUFACTURING STEEL BELTED PLANKS FROM SCRAP TIRES

(75) Inventor: Djavad Khadem, Mansfield (GB)

(73) Assignee: Bijan Kasraie, Atlanta, GA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/339,301

(22) Filed: Jun. 23, 1999

(65) Prior Publication Data

US 2002/0098318 A1 Jul. 25, 2002

Related U.S. Application Data

(60) Provisional application No. 60/114,700, filed on Jan. 4, 1999.

(51) Int. Cl.[7] ............................................. B32B 31/20
(52) U.S. Cl. ...................... 156/95; 428/903.3
(58) Field of Search .................. 428/903.3; 52/DIG. 9; 156/95

(56) References Cited

U.S. PATENT DOCUMENTS

| | | | | |
|---|---|---|---|---|
| 5,096,772 A | | 3/1992 | Snyder | 428/295 |
| 5,246,754 A | | 9/1993 | Miller | 428/36.91 |
| 5,340,630 A | | 8/1994 | Tripp | 428/54 |
| 5,360,286 A | | 11/1994 | Russell | 404/6 |
| 5,412,921 A | | 5/1995 | Tripp | 52/729 |
| 5,472,750 A | | 12/1995 | Miller | 428/2 |
| 5,575,121 A | | 11/1996 | Lajaunie | 52/144 |
| 5,601,004 A | | 2/1997 | Queen | 82/54 |
| 5,834,083 A | * | 11/1998 | Pignataro | 428/903.3 |
| 6,258,193 B1 | * | 7/2001 | Coffin | 428/903.3 |

* cited by examiner

*Primary Examiner*—Alexander S. Thomas
(74) *Attorney, Agent, or Firm*—Joseph G. Mitchell, Esq.

(57) ABSTRACT

A steel reinforced rubber plank made from discarded or scrap tires. The sidewalls and bead are removed from a scrap tire. The remaining belt is cut open to form a rubber strip. Next, the rubber strips are buffed to provide a better bonding surface. Then the bonding agents are applied to the treaded side of each rubber strip, each of the two strips are put together tread face to tread face to form a plank, pressed and heated until the two strips are completely vulcanized. The two-ply plank is then profiled into a final product.

4 Claims, 4 Drawing Sheets

One horizontally cut tire belt also referred to as Strip

1st tire after removal of Side Walls & Beads, cut horizontally

2nd tire after removal of side Walls & Beads, cut horizontally

1st and 2nd tire are fused by a four-step process to make Akamite

MANUFACTURING STEEL BELTED PLANKS FROM SCRAP TIRES

CROSS REFERENCES TO RELATED APPLICATIONS

This application claims the benefit of Provisional Patent Application Ser. No. 60/114,700 filed Jan. 4, 1999.

BACKGROUND—Field of Invention

Recycling

This invention relates to recycled rubber tires, specifically as a construction material substitution.

BACKGROUND—Description of Prior Art

Disposal of scrap tires remains a problem intrinsic to the exponential generation of scrap tires. Above-ground storage of scrap tires is an unsightly and potentially dangerous solution. These scrap tires represent a health hazard because they provide breeding places for disease-bearing mosquitoes and vermin. Scrap tires deposited at a land fill site may also become a fire hazard, dangerous not only in itself but because burning scrap tires produce noxious and health-threatening fumes. In addition, burned tires leave a residue of an oily pryolysate which can contaminate ground waters and soil. One method of disposal of scrap tires is burning them as a fuel additive. In this case, poisonous fumes are emitted into the atmosphere during the burning process. Thus, the recycling industry recognizes that the only way to usefully and safely dispose of scrap tires is to develop and market uses for various products produced from recycled tires.

U.S. Pat. No. 5,096,772 to Robert H. Snyder (Mar. 17, 1992) is not aesthetically homogenious as AKAMITE. This product is a series of belts bonded together, each belt being detreaded and freed of the tire bead and sidewalls. A significant disadvantage to this product is that the tread is removed from belt. This creates additional disposal problems. Another difference and disadvantage of this product is that steel wires unevitably will protrude from the surface and may stick out and make the form hard to handle or unsafe. This product would be more difficult to paint due to roughness and would be hard to clean if necessary. AKAMITE is a far superior product because of the way it is smoothed and bonded, this makes it safer, tougher and more aesthetically appealing for applications in construction and building materials.

U.S. Pat. No. 5,246,754 to Edward L. Miller (Sep. 21, 1993). The patent is for making a generally cylindrical and substantially solid composite post from scrap tires which is totally different in process and purpose of the AKAMITE products. AKAMITE has many applications in construction, highway, recreational, landscape, etc.

U.S. Pat. No. 5,360,286 to Thomas W. Russell (Nov. 11, 1994). The patent is for making highway traffic barriers from scrap tires comprising a plurality of strips cut from the treads of tires and is limited to such application whereas AKAMITE has many applications in construction, highway, recreational, landscape, etc.

U.S. Pat. No. 5,412,921 to Benjamin A. Tripp (May 9, 1995). The patent is for making an I-beam structure made of truck and/or car tires, centrally along their lengths tread to tread and each ply is a continuous tire belt reinforced with mechanical fasteners such as staples or screws to produce a "belt" or "tire belt". This I-beam structure consists of a web and two flange members. The purpose and process of this product is totally different than AKAMITE.

U.S. Pat. No. 5,472,750 to Edward L. Miller (Dec. 5, 1995). The patent is a construction element made from tire carcasses. A general purpose laminated construction block element that is constructed from discarded rubber-like material such as tire casings or belt conveyer straps. This product is not using recycled tires exclusively. It has exposed rough edges which may be sharp or hazardous to work with wheras AKAMITE is bonded tread to tread and smooth. This makes its' application more aesthetic and paintable. It will also not hold dirt or debris in its crevices. The purpose and process of this product is totally different than AKAMITE.

U.S. Pat. No. 5,575,121 to Philippe Lajaunie (Nov. 19, 1996). The patent is a sound barrier wall construction which uses tire sections. The concave, partly open face of each tire section is arranged in stacked rows to absorb sound. It is related to barriers and sound barrier applications around highways construction sites and airports specifically. Although this method claims to be installed to keep water from collecting in its crevices. AKAMITE would be an effective application to sound barriers as it can be stacked with no crevices for water or elements to collect and is more attaractive of an application as tire shapes can be rather unsightly if stacked along highways as barriers. Since AKAMITE is solid it would absorb noise also. The purpose and process of this product is totally different than AKAMITE.

U.S. Pat. No. 5,601,004 to David A. Queen (Jan. 11, 1997). The patent is a tire cutting apparatus.

U.S. Pat. No. 5,340,630 to Benjamin A. Tripp (Aug. 23, 1994). The patent is for a two-ply laminated material made from used vehicle tires. The individual tread tire belts are joined end to end to form a very long strip of laminated material to be used as tubes and other products. The finished article of manufacture does not produce a readily usable product. The purpose and process of this product is totally different than AKAMITE.

U.S. Pat. No. 5,340,630 to Benjamin A. Tripp connects individual tire belts together to make them longer. Tripp claims the connection of two continuous elongated tire belts to increase their length.

The present invention fuses two tire belts together by superimposing them along their entire length, so as to drastically increase the strength of the resulting material. The resulting material is a single steel belted plank. Tripp's invention is materially different in that its purpose is to create a continuous elongated tire belt by connecting at least two individual tire belts.

According to Tripp, in his invention, the load carrying capacity of the continuous ply belt is reduced by up to 90% of the magnitude of a load in tension that an individual tire belt can carry.

SUMMARY INCLUDING OBJECTS AND ADVANTAGES

A steel reinforced rubber plank made from scrap or discarded tires. The manufactured product is a two-ply plank which may be used in a variety of construction, engineering, railroad, highways, and civil applications.

OBJECTS AND ADVANTAGES

The primary goal of this invention is to provide a new composite form of material made from scrap tires which has excellent strength, durability and aesthetic appearance, and many other attributes. A further object of this invention is to form elements inexpensively by using discarded tires as the primary raw material and by using a process that consumes very little energy. A further object is to preserve the environment by disposing of scrap tires without creating secondary air pollution in the process. A further object of the invention is to limit deforestation of trees by providing an economical replacement for wood and lumber products. Another object of the invention is to provide an alternative building product that is more durable and cost efficient than traditional building materials, such as wood, steel or aluminum in consideration of the life cycle costs of those materials.

Other objects of the invention include producing a safe alternative product to be used for building fences, creating barriers to prevent erosion, maintaining flood control, establishing containment or retaining walls, replacing traditional wooden posts and sign posts, and acting as a substitute material for roofing and other building applications.

Still further objects and advantages will become apparent from a consideration of the ensuing description and accompanying drawings.

BRIEF DESCRIPTION OF THE DRAWINGS

FIG. 3 is a compartmentalized drawing of the process showing the whole tire and each removal illustration of tread, side wall and bead.

PREFERRED EMBODIMENT—Description

Figure 1:
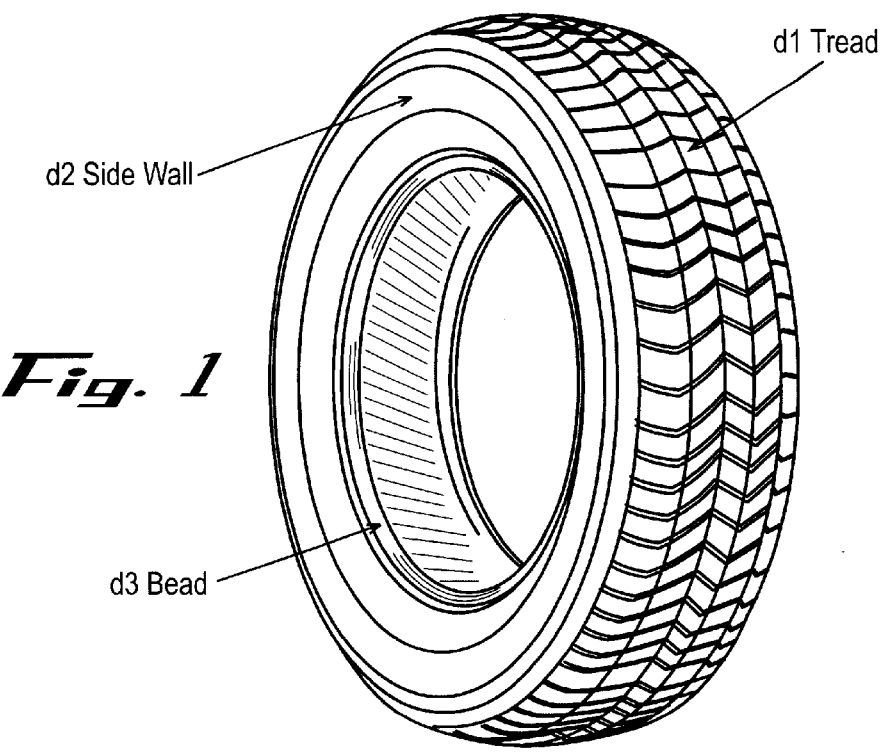
FIG. 1 is a whole tire oblique showing d1 as tread, d2 as the sidewall, and d3 as a bead of which are removed during the process.
Figure 2:
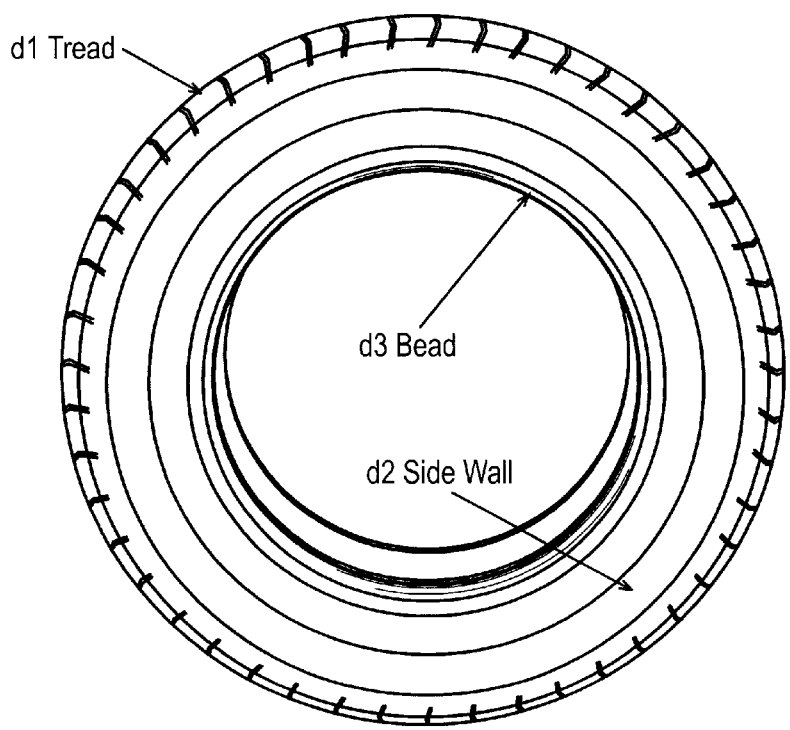
FIG. 2 shows the whole tire side view with d1 marking tread, d2 marking side wall and d3 marking the bead of the tire which will be removed during the process.
Figure 1:
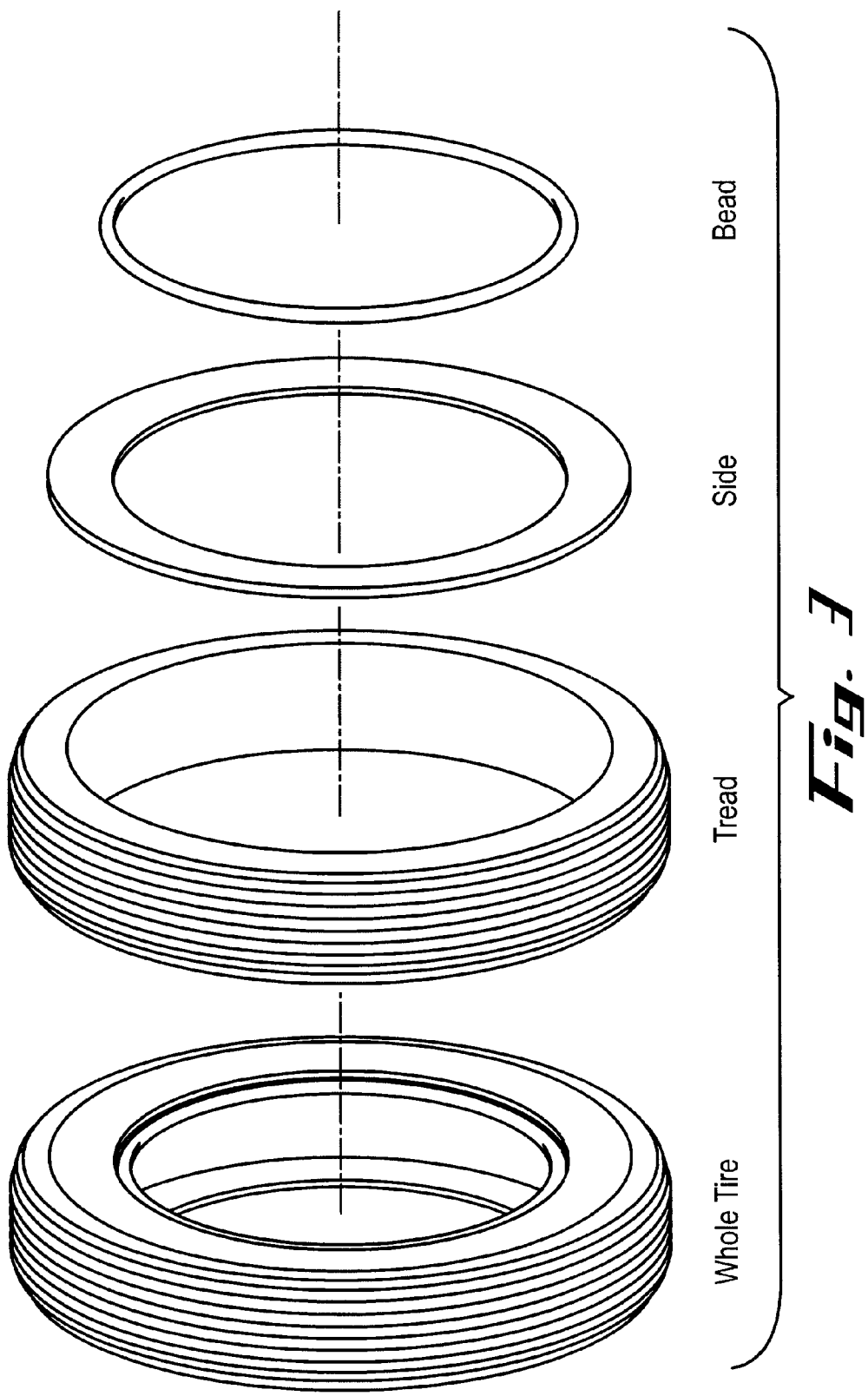
Figure 5:
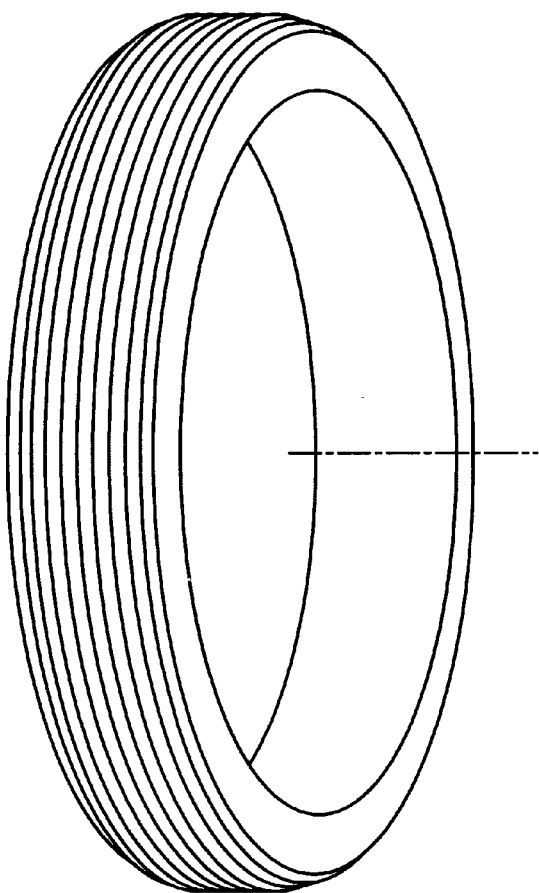
FIG. 5 is a view of the belt, tread included before it is cut.
Figure 4:
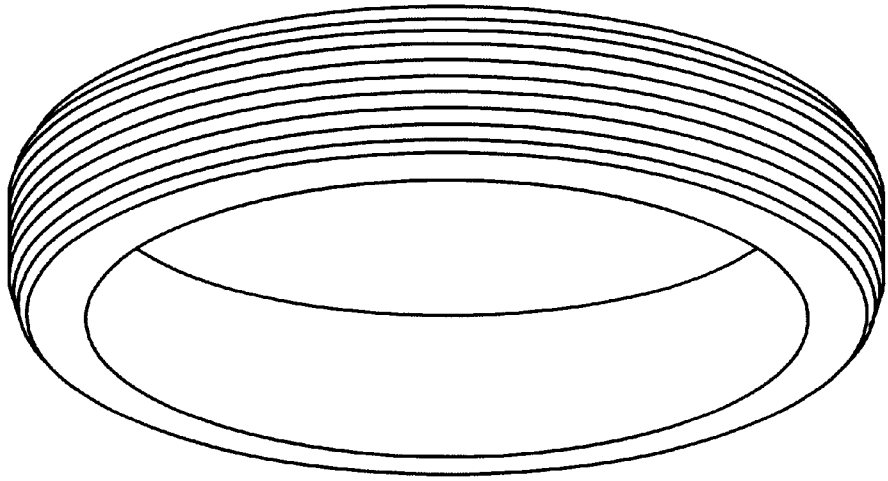
FIG. 4 shows the tire once the side walls and beads are removed.
Figure 6:
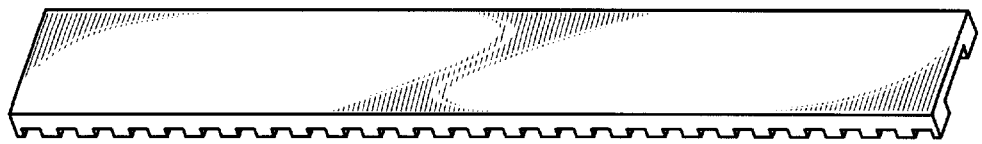
FIG. 6 is a view of the horizontally cut belt before it is buffed.
Figure 7A:
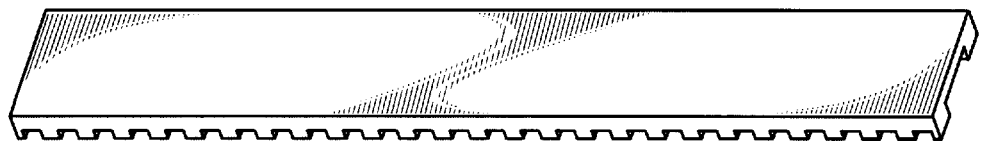
FIG. 7 is a view in detail of the first tire after removal of side wall and bead cut horizontally and buffing and the second tire after the same. Showing d7 as length and d6 as thickness. The treaded surfaces are laid tread face to tread face before they are bonded together.
Figure 7B:
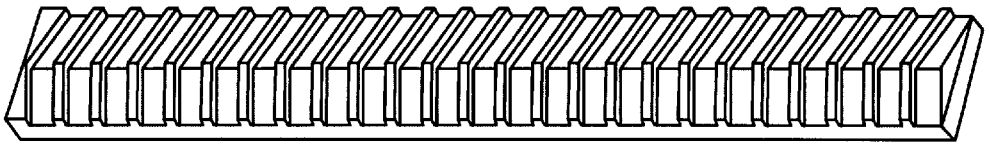
Figure 7C:
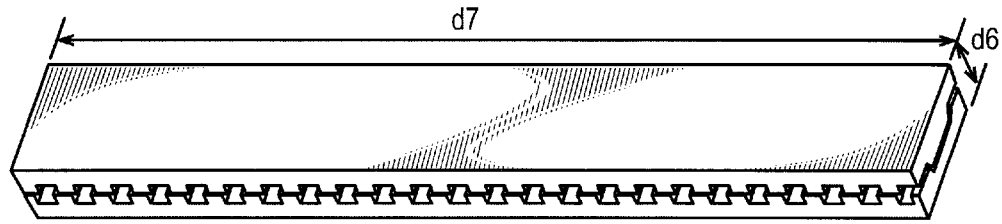
Figure 8:
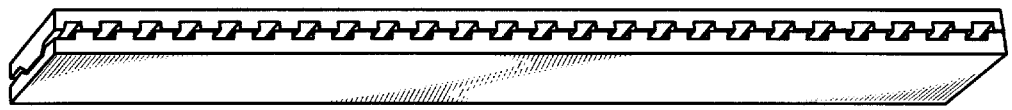
FIG. 8 is a perspective view of my invention, plank named AKAMITE after it is bonded, cooled and finished. This two ply plank process can be repeated to manufacture thicker planks.

The process of transforming the scrap tire, FIG. 1, into AKAMITE begins with the removal of the side wall and bead. FIG. 2, FIG. 2, d1 and FIG. 2, d2 and FIG. 3 and FIG. 4. The belt, tread included, FIG. 5, is then cut horizontally to form a strip, FIG. 6. The strip is passed through a buffing machine which removes a fine layer of rubber from the tread side using rotary buffing heads. The fine buffed material resulting from the process is collected by means of an air extraction system to prevent the material from entering the atmosphere. The retrieved buffing, sized around 40 mesh, can be used to make other products. The buffed plank is then passed through a bonding preparation machine which applies a thin layer of bonding agent about 1 micron in thickness to the treaded side of the strip. After drying the strip in a heating tunnel, the treaded surfaces are laid tread face to tread face. The matched treaded surfaces then go into frames designed to hold and compress them. The frames are locked down with locking nuts and loaded onto the autoclave rail feeding system and sent into the autoclave. Control of heat and pressure in the autoclave assures a consistent quality bond. The resulting two-ply plank is called AKAMITE, FIG. 7. After the two tire belts have been bonded into a plank and cooled, it requires finishing and profiling by the water-cutting system. This water-cutting system can cut and profile up to ten planks at a time. The process can be repeated to manufacture thicker planks built from the original two-ply plank. The planks can then be cut into shapes and forms as required by the different applications.

PREFERRED EMBODIMENT—Operation

By removing the sidewall and bead of a discarded or scrap tire and retaining the steel belt and treads a strip of steel-belted rubber material is created. The tread side of the steel-belted strip is buffed and a bonding agent is applied. Two steel belted strips are vulcanized together by placing the strips with the bonding agent, tread face to tread face, under pressure and by heat processing in an autoclave. The two-ply planks are then cut into their appropriate shapes and forms by a water cutting device.

CONCLUSIONS, RAMIFICATIONS, AND SCOPE

Accordingly, it can be seen that I have provided a method to create a new composite form of material made from scrap tires which is stronger than wood and plastic and its life cycle costs less than metal, plastic and wood.

Although the description above contains many specificities, these should not be construed as limiting the scope of the invention but as merely providing illustrations of some of the presently preferred embodiments of this invention. Various other embodiments and ramifications are possible within it's scope. For example, barrier fence posts, sign posts, flood barriers, storage facilities, roofing, foundations, guard rail posts, railroad ties, shoreline errosion preventor, sound barriers, ground supports, and general construction material.

Thus the scope of the invention should be determined by the appended claims and their legal equivalents, rather than by the examples given.

What is claimed is:

1. The process of manufacturing a steel belted plank, comprising the steps of:
   (a) removing the side wall and bead from a first scrap tire;
   (b) removing the side wall and bead from a second scrap tire;
   (c) cutting said first scrap tire across to form a first rubber strip;
   (d) cutting said second scrap tire across to form a second rubber strip;
   (e) buffing the tread side of said first rubber strip which removes a fine layer of rubber from said tread side of said first rubber strip;
   (f) buffing the tread side of said second rubber strip which removes a fine layer of rubber from said tread side of said second rubber strip;
   (g) applying a bonding agent about one micron in thickness to said tread side of said first rubber strip;
   (h) applying a bonding agent about one micron in thickness to said tread side of said second rubber strip;
   (i) drying said bonding agent onto said first rubber strip;
   (j) drying said bonding agent onto said second rubber strip;

(k) matching said tread side of said first rubber strip to said tread side of said second rubber strip whereby said first rubber strip is covering said second rubber strip along its entire length;

(l) pressing, by means of a frame, said first rubber strip and said second rubber strip together whereby said first rubber strip and said second rubber strip are held together and compressed; and (m) applying heat and pressure, by means of an autoclave, whereby said first rubber strip and said second rubber strip are bonded together to form said steel belted plank.

2. The process of claim 1, further comprising the step of (n) cooling said steel belted plank.

3. The process of claim 2, further comprising the step of (o) cutting said steel belted plank into shapes.

4. The process of manufacturing a steel belted plank, comprising the steps of:

(a) removing the side wall and bead from a first scrap tire;

(b) removing the side wall and bead from a second scrap tire;

(c) cutting said first scrap tire across to form a first rubber strip;

(d) cutting said second scrap tire across to form a second rubber strip;

(e) buffing the tread side of said first rubber strip which removes a fine layer of rubber from said tread side of said first rubber strip;

(f) buffing the tread side of said second rubber strip which removes a fine layer of rubber from said tread side of said second rubber strip;

(g) applying a bonding agent about one micron in thickness to said tread side of said first rubber strip;

(h) applying a bonding agent about one micron in thickness to said tread side of said second rubber strip;

(i) drying said bonding agent onto said first rubber strip;

(j) drying said bonding agent onto said second rubber strip;

(k) matching said tread side of said first rubber strip to said tread side of said second rubber strip whereby said first rubber strip is covering said second rubber strip along its entire length;

(l) pressing, by means of a frame, said first rubber strip and said second rubber strip together whereby said first rubber strip and said second rubber strip are held together and compressed;

(m) applying heat and pressure, by means of an autoclave, whereby said first rubber strip and said second rubber strip are bonded together to form said steel belted plank;

(n) cooling said steel belted plank; and (o) cutting said steel belted plank into shapes.

* * * * *